Oct. 8, 1963   A. L. KORR   3,106,091
SYSTEMS FOR MEASURING MOMENTS OF INERTIA
Filed Nov. 30, 1960   4 Sheets-Sheet 1
*Fig. 1*
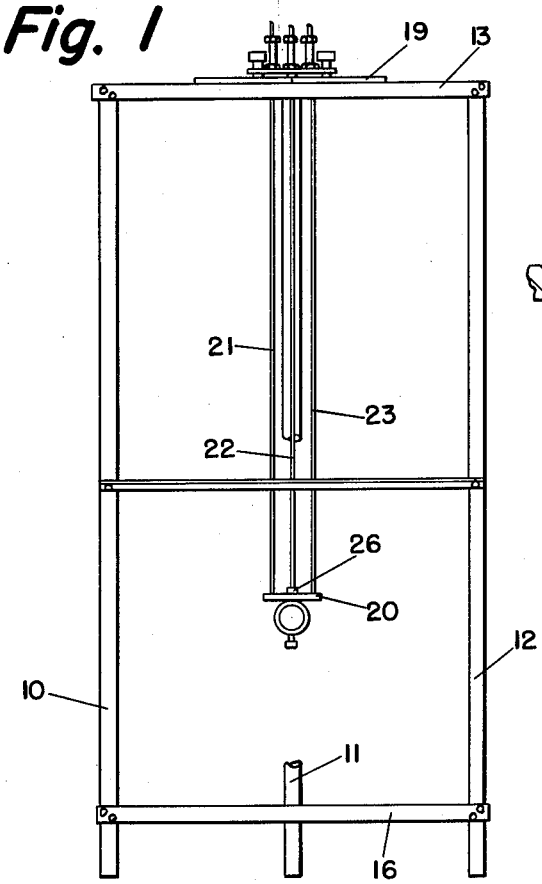
*Fig. 3*
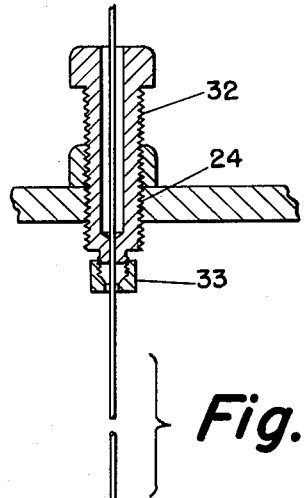
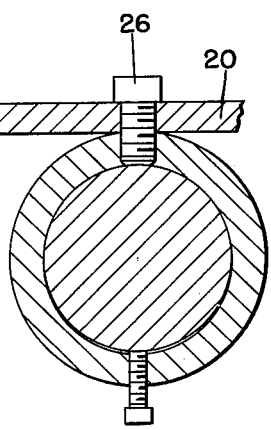
*Fig. 2*
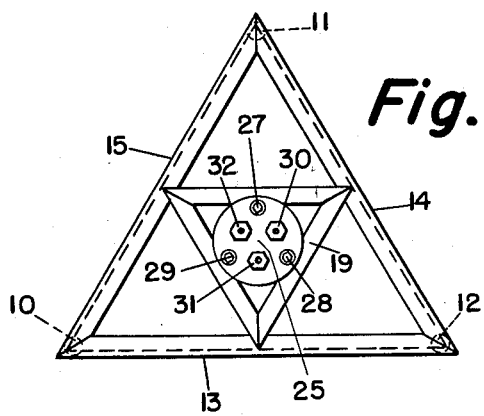
INVENTOR.
ABRAHAM L. KORR
BY
S. J. Rotondi, a. J. Dupont &
S. Dubroff   ATTORNEYS

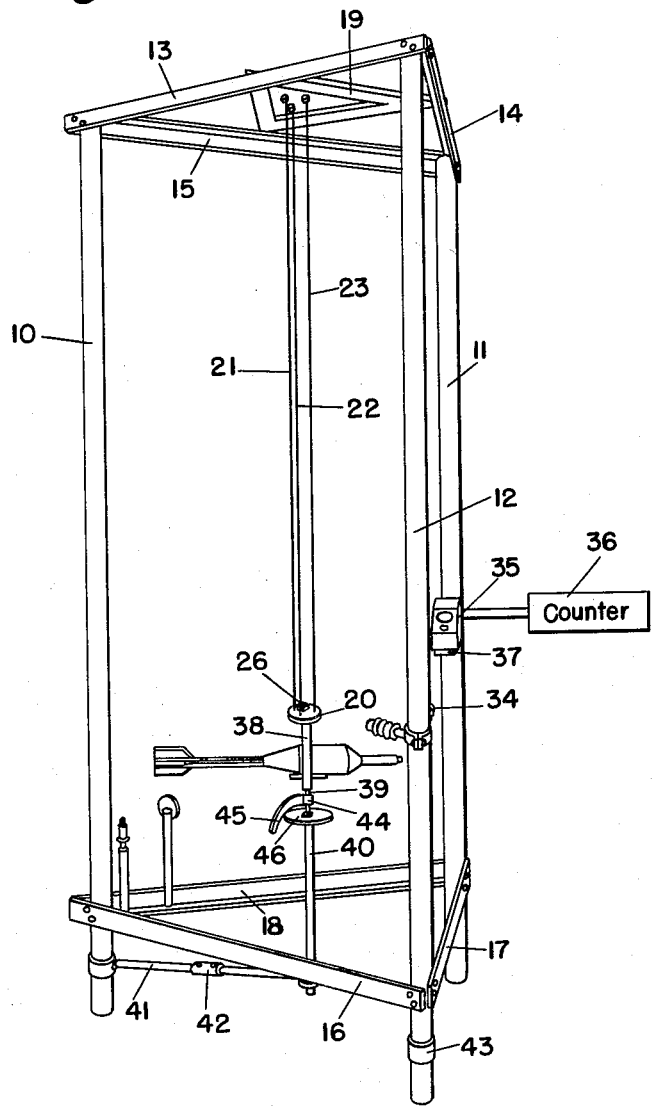

Oct. 8, 1963 A. L. KORR 3,106,091
SYSTEMS FOR MEASURING MOMENTS OF INERTIA
Filed Nov. 30, 1960 4 Sheets-Sheet 3

INVENTOR.
ABRAHAM I. KORR
BY
ATTORNEYS.

Oct. 8, 1963 A. L. KORR 3,106,091
SYSTEMS FOR MEASURING MOMENTS OF INERTIA
Filed Nov. 30, 1960 4 Sheets-Sheet 4

INVENTOR.
ABRAHAM L. KORR
BY
ATTORNEYS 3,106,091
SYSTEMS FOR MEASURING MOMENTS
OF INERTIA
Abraham L. Korr, Philadelphia, Pa., assignor to the United States of America as represented by the Secretary of the Army
Filed Nov. 30, 1960, Ser. No. 72,810
3 Claims. (Cl. 73—65)
(Granted under Title 35, U.S. Code (1952), sec. 266)

The invention described herein may be manufactured and used by or for the Government for governmental purposes without the payment to me of any royalty thereon.

This invention relates to systems for measuring moments of inertia, and has for its purpose the provision of an improved system and method of operation whereby the moment of inertia of an asymmetrical object may be determined readily and with a high degree of accuracy.

The determination of the moments of inertia of physical objects is essential when it relates to items which are used in the design of any device which can develop a dynamic instability. When the item has a regular geometrical configuration, it is usually possible to calculate the value of its moment of inertia by formuli presently available in the literature. Often, however, the complexity of a particular object or part may be such that it is impractical or impossible to compute its moment of inertia by purely analytical methods. In such cases, experimental methods are of great help in obtaining solutions. Even where values have been computed, it is good practice to confirm these values by experiment as soon as the part has been fabricated.

In accordance with the present invention, these results are achieved by an improved system and method of operation which involves the use of a plurality of standard objects to derive a calibration curve. As hereinafter explained, these standard objects have progressively heavier weights W' and are oscillated about their centers of gravity through the same amplitude to derive the data on which the calibration curve is based. Thereafter the tested object is oscillated about its center of gravity through the same amplitude as the standards to determine its oscillation time T, and the product $T^2W$ (W being the weight of the tested object) is utilized with the calibration curve to determine the moment of inertia of the tested object.

The invention will be better understood from the following description when considered in connection with the accompanying drawings and its scope is indicated by the appended claims.

Referring to the drawings:

FIGS. 1, 2 and 3 show various views of the torsion pendulum,

FIG. 4 shows the relation between the pendulum and other parts of the system,

Figure 5:
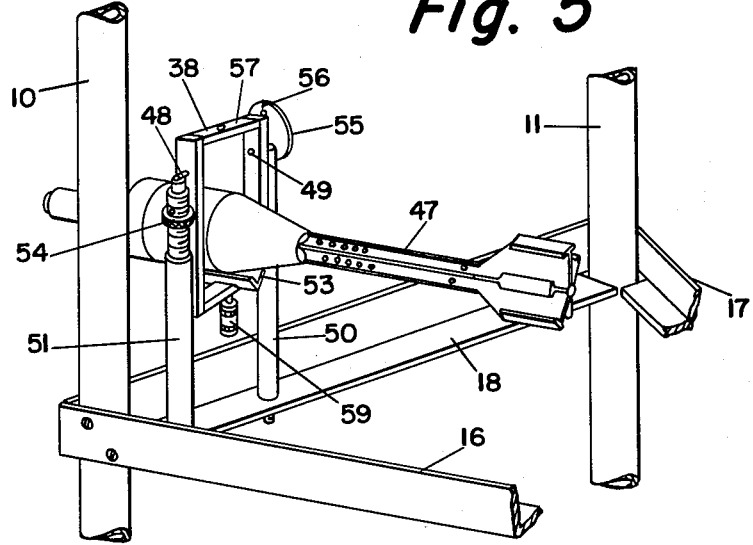
Figure 6:
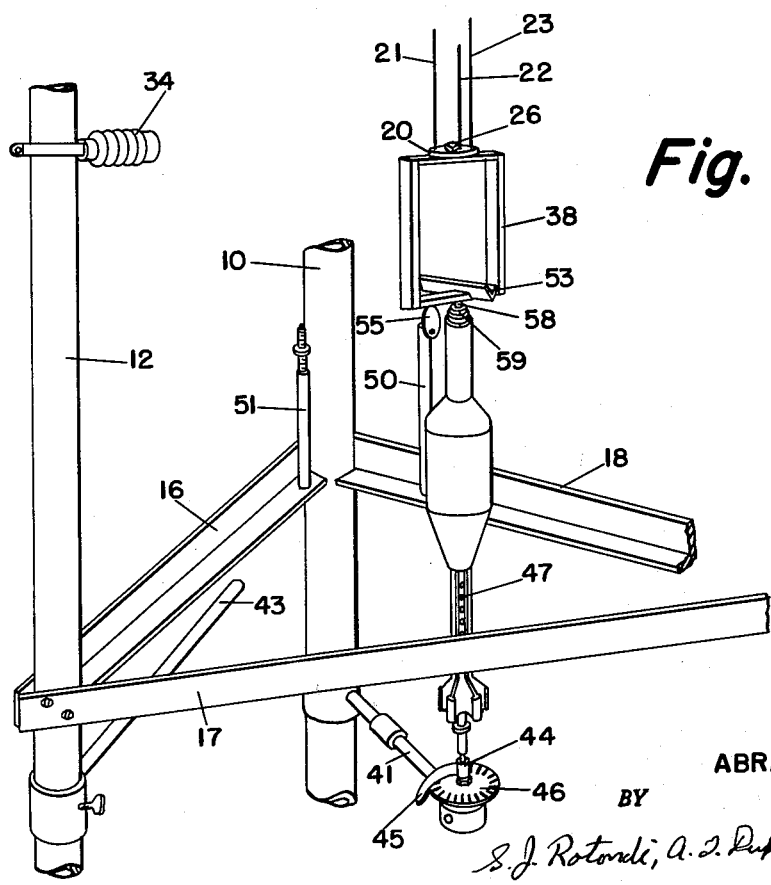
Figure 7:
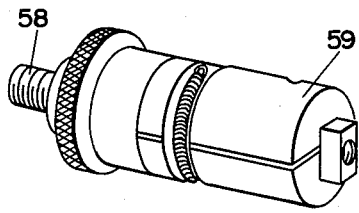
Figure 8:
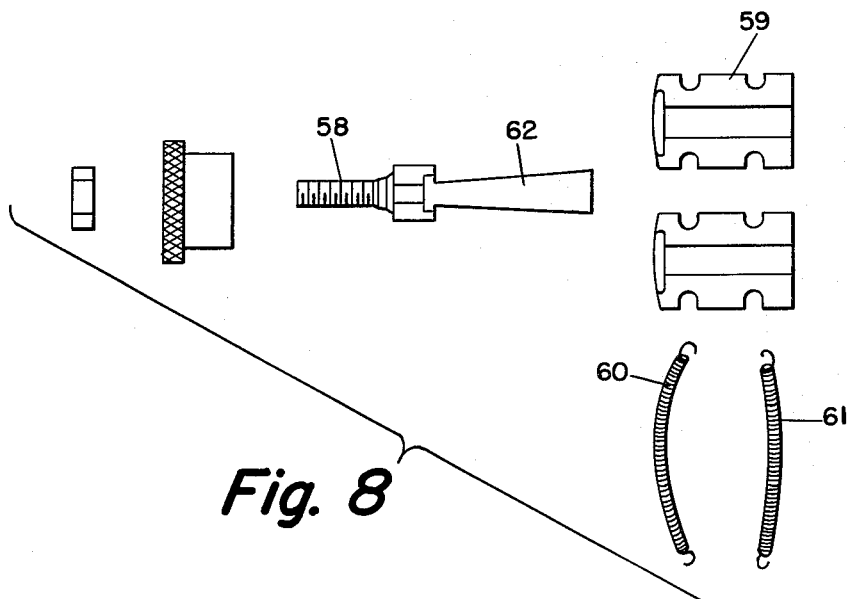
Figure 9:
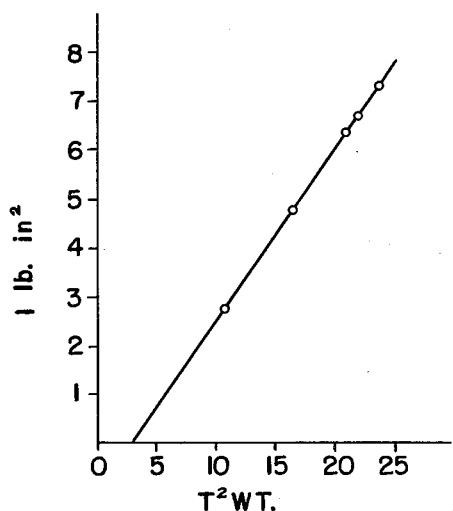

FIG. 5 shows how the object to be tested is positioned in its support with its center of gravity in the axis about which it is rotated by the pendulum, FIG. 6 illustrates how the system is utilized to measure the moment of inertia about the longitudinal axis of an object, FIGS. 7 and 8 show a device for attaching the tested device to the pendulum as indicated by FIG. 6, and FIG. 9 is a calibration curve obtained from a plurality of standards which have known moments of inertia and known weights.

As indicated by FIGS. 1, 2 and 3, the system includes a pendulum with three legs 10, 11 and 12 which are tied together at the top by members 13, 14 and 15 and near the bottom by members 16, 17 and 18 (FIG. 4). Resting on the members 13, 14 and 15 is a support 19 from which a specimen support plate 20 is suspended by means of three wires 21, 22 and 23. The support 19 has accurately located holes 24 equally spaced with respect to the center 25 (FIGS. 2 and 3) of the support for the pendulum support wires. The plate 20 has accurately drilled holes matching the location of the holes in the support 19, has an accurately machined hole in its center to hold a bolt 26, and has engraved on its upper surface concentric circles which are evenly spaced from the center of the bolt 26.

For rough adjustment in the level of the plate 20, bolts 27, 28 and 29 are utilized. Fine adjustments in the level of the plate 20 are effected by means of bolts 30, 31 and 32. These bolts have a longitudinal opening for receiving the wires and ground nuts which are utilized in the leveling operation. Each wire is locked in the lower end of the bolt by a split collet 33 (FIG. 3).

The main bolt 26 has a special hexagonal head which has one of its faces machined with a mirrored laboratory cover glass glued thereto. This mirror cooperates with a light source 34 (FIG. 4) and a photoelectric device 35 to apply to the input of a counter 36 an electric pulse for each oscillation of the plate 20. This photoelectric device is supported on an arm 37 which is adjustable about and fixable to the upright 11.

The bolt 26 is threaded into a specimen support 38 which may be in the form of a ring or a rectangle and has a hole located in its lower side at 180° from the center line of the bolt 26. Through this hole is threaded a holding and positioning bolt 39 which may be utilized to fix an angular support member 53 (FIG. 5) to the lower side of the member 38 and has at its lower end a tapered hole which acts as a guide and bearing for a guide assembly 40.

The guide assembly 40 has a threaded shaft which is pointed to fit into the tapered hole on the lower end of the bolt 39. The whole assembly is supported on an arm 41 (FIG. 4) which is rotatable about the support 10 and has a slip joint 42 whereby its length may be varied. This permits adjustment of the assembly to a position where the point of assembly shaft is in the oscillatory axis of the pendulum. An auxiliary or locking arm 43 (FIG. 6) meets with a recess in the arm 41 for locking it in this position. In this position, the guide assembly limits the amount of induced longitudinal oscillations of the pendulum. It is long enough to maintain a line contact for maximum oscillations within the limits of maximum rise and fall of the pendulum. Although this contributes to the damping of the oscillations due to the friction developed by occasional line contact, this damping is insignificant when compared to the damping resulting from uncontrolled oscillation of the pendulum.

A keyed sleeve 44 with a positioning arm 45 slides over the bolt 39 and keys into a groove in this bolt. When this arm is turned and released it slips away leaving the bolt free to oscillate. By turning the bolt through a predetermined angle, as indicated by a scale engraved on the disk 46, the pendulum is repeatedly set into operation with the same amplitude of oscillation.

FIG. 5 indicates how the object 47 to be tested is positioned in the support 38. This support has at its opposite sides pins 48 and 49 which rest on uprights 50 and 51. Upright 51 is adjustable in height by means of a knurled nut 54. Upright 50 has at its upper end a disk 55 bearing a mark 56 which registers with a mark 57 on the member 38 when the member 38 is leveled by the nut 54 and the gravitational center of the tested object is alined with the centers of the top and bottom holes of the member 38. With tested object so arranged in the holder 38, the holder is attached to the plate 20 as indicated in FIG. 4 and the objects longitudinal moment of inertia is determined as previously indicated and hereinafter explained in greater detail.

FIG. 6 indicates how the object 47 is positioned to determine its transverse moment of inertia. In this case, the tested object is attached to the support 38 by means of the device shown in FIGS. 7 and 8. This device replaces the bolt 39 of FIG. 4. It has a threaded end 58 which goes into the lower hole of the support 38 and an expanding end 59 which goes into a hole in the end of the tested object. The expanding end 59 consists of two parts which are held together by a pair of springs 60 and 61 and are forced outwardly into engagement with the tested object by a wedge-shaped end 62.

FIG. 9 shows the type of calibration curve obtained from a plurality of standard objects having known moments of inertia. In this curve, moments of inertia are plotted as ordinates and the products $T^2W$ are plotted as abscissae, T being the oscillation time of the object and W being its weight.

In the operation of the system to derive the data for such a curve, the oscillation time of each standard object mounted on its center of gravity as previously described is timed by the counter 36 which includes two timers. These timers are used one after another for successive counts of twenty cycles and are reset at the end of each count. An average of the time taken for the oscillation is derived and is utilized in plotting the curve.

An unknown object is then centered on the support 38 as previously explained and the time for one period of its oscillation is found and squared. The square of the time is multiplied by the weight of the object, this product is located on the abscissae of the curve, and the corresponding moment of inertia is located on the ordinates of the curve. From this moment of inertia the moment of intertia of the frame and all the other holding devices is subtracted to derive the inertial moment of the unknown object. Obviously different sets of standard or calibration objects may be utilized in connection with tested objects in particular ranges of weight.

I claim:

1. In a system for determining the moment of inertia of an asymmetrical object, the combination of a curve showing the relation between the moment of inertia and the product of the weight and the square of the oscillation time through a predetermined amplitude of each of a plurality of standards having a common dimension and a progressively changing dimension, a trifilar pendulum having a support which is oscillatable about a predetermined axis, means for locating an asymmetrical object on said support with its gravitational center in said axis, said locating means including vertically spaced and aligned centering means for guiding respective upper and lower portions of said object, means for imparting to said support oscillations of said predetermined amplitude, and means for determining the average time of said oscillations whereby the product of the square of said time and the weight of said object may be utilized to derive from said curve the moment of inertia of said object.

2. The combination of claim 1 wherein the lower centering means is vertically adjustable.

3. In a method of determining the moment of inertia of an asymmetrical object supported by a trifilar pendulum, the steps which include forming a plurality of homogeneous standards having known moments of inertia, measuring the average time for each standard to oscillate about its center of gravity through a predetermined amplitude, plotting the moments of inertia of said standards as a function of the products of the weights and the squares of the oscillation times of said standards, measuring the time of the oscillation of said asymmetrical object about its center of gravity through said amplitude, and ascertaining from said plotted products the moment of inertia corresponding to the product of the weight and the square of the time of the oscillation of said asymmetrical object through said amplitude.

References Cited in the file of this patent

UNITED STATES PATENTS

| 2,871,693 | Novratil et al. | Feb. 3, 1959 |
| 3,040,563 | Eckles et al. | June 26, 1962 |

FOREIGN PATENTS

| 234,543 | Great Britain | May 26, 1925 |

OTHER REFERENCES

Weber, White and Manning: College Physics, published by McGraw-Hill Book Co., Inc., New York, N.Y. (pages 164, 353, 511 and 561).